(12) United States Patent
Li et al.

(10) Patent No.: US 11,991,543 B2
(45) Date of Patent: May 21, 2024

(54) METHOD AND APPARATUS FOR MINIMIZATION OF DRIVE TESTS

(71) Applicant: ZTE CORPORATION, Guangdong (CN)

(72) Inventors: Dapeng Li, Guangdong (CN); Yin Gao, Guangdong (CN); Yang Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 273 days.

(21) Appl. No.: 17/400,978

(22) Filed: Aug. 12, 2021

(65) Prior Publication Data

US 2021/0377764 A1 Dec. 2, 2021

Related U.S. Application Data

(63) Continuation of application No. PCT/CN2019/075077, filed on Feb. 14, 2019.

(51) Int. Cl.
*H04W 24/08* (2009.01)
*H04W 24/10* (2009.01)
(Continued)

(52) U.S. Cl.
CPC .......... *H04W 24/08* (2013.01); *H04W 24/10* (2013.01); *H04W 92/045* (2013.01); *H04W 92/10* (2013.01)

(58) Field of Classification Search
CPC .............................. H04W 24/10; H04W 24/08
See application file for complete search history.

(56) References Cited

U.S. PATENT DOCUMENTS

2013/0114446 A1* 5/2013 Liu ................. H04W 24/10
370/252
2018/0184312 A1* 6/2018 Yi .................... H04W 24/08
(Continued)

FOREIGN PATENT DOCUMENTS

CN 103260175 A 8/2013
WO 2016161775 A1 10/2016
(Continued)

OTHER PUBLICATIONS

Ericsson, "Packet delay and drop rate for MDT QoS measurements" 3GPP TSG-RAN WG2 #90, Tdoc R2-152521, Fukuoka, Japan, May 29, 2015 (May 29, 2015), pp. 1-7.
(Continued)

*Primary Examiner* — Yee F Lam
(74) *Attorney, Agent, or Firm* — Duane Morris LLP

(57) ABSTRACT

A method and apparatus for a Minimization of Drive Tests (MDT) for delay-critical services is disclosed. In one embodiment, a method for performing a Minimization of Driver Test (MDT) by a first wireless communication node, includes: receiving a first message from a second wireless communication node; and determining at least one of the following: a data packet discard rate and a packet discard delay according to the first message, wherein the first message comprises a MDT configuration, wherein the MDT configuration indicates a measurement of at least one of the following: the data packet discard rate and the packet discard delay, wherein the MDT configuration comprises at least one of the following: a measurement period and a first Packet Delay Budget (PDB).

9 Claims, 9 Drawing Sheets

(51) Int. Cl.
*H04W 92/04* (2009.01)
*H04W 92/10* (2009.01)

(56) References Cited

U.S. PATENT DOCUMENTS

| | | | |
|---|---|---|---|
| 2019/0124572 A1* | 4/2019 | Park | H04W 80/10 |
| 2019/0141550 A1* | 5/2019 | Yi | H04W 24/10 |
| 2019/0159277 A1* | 5/2019 | Zhu | H04L 45/16 |
| 2019/0223055 A1* | 7/2019 | Bor Yaliniz | H04W 48/16 |
| 2020/0112975 A1* | 4/2020 | Moon | H04W 8/04 |
| 2020/0187040 A1* | 6/2020 | Tsai | H04W 24/10 |
| 2020/0351693 A1* | 11/2020 | Jung | H04W 24/08 |
| 2021/0014722 A1* | 1/2021 | Han | H04W 28/0263 |
| 2021/0235525 A1* | 7/2021 | Schmidt | H04W 88/04 |
| 2021/0360449 A1* | 11/2021 | Kim | H04W 24/08 |

FOREIGN PATENT DOCUMENTS

| | | | | |
|---|---|---|---|---|
| WO | WO-2017026686 A1 * | 2/2017 | | H04L 12/4625 |
| WO | WO-2020030730 A1 * | 2/2020 | | H04W 4/025 |

OTHER PUBLICATIONS

3GPP TS 36.314 V12.0.0, 3rd Generation Partnership Project; Technical Specification Group Radio Access Network; Evolved Universal Terrestrial Radio Access (E-UTRA); Layer 2—Measurements, Sep. 30, 2014 (Sep. 30, 2014), pp. 11-18.
Nokia Networks: "Queuing delay measurement" 3GPP TSG-RAN WG2 Meeting #91bis, R2-154105, Malmo, Sweden; 20151005-201510094 Oct. 2015 (Oct. 4, 2015), 4 pages.

* cited by examiner

METHOD AND APPARATUS FOR MINIMIZATION OF DRIVE TESTS

TECHNICAL FIELD

This disclosure relates generally to wireless communications and, more particularly, to a method and apparatus for a Minimization of Drive Tests (MDT) for delay-critical services.

BACKGROUND

With a continuous increasing of global smartphone users, mobile data usage and traffic will continue to grow. In New Radio (NR), a new type of quality of service (QoS) is introduced to meet a demand for delay-sensitive services, such as intelligent transportation systems, dispersed automatic manufacturing systems, etc. The new type of QoS introduced in NR has a high requirement in latency and data packets that are not transmitted within a predefined delay is determined as discarded packets. However, the discarded packets caused by delay can prevent important information from being successfully delivered resulting in serious impacts, e.g., increasing traffic accidents and reducing yield. Therefore, monitoring and understanding an actual transmission quality is critical for the delay-sensitive services.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with various embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In LTE dual connectivity (DC), a wireless communication device (UE) may have multiple serving cells belong to different wireless communication nodes (eNBs) including a primary eNB (MeNB) and at least one secondary eNB (SeNB), and a primary cell in a MeNB is named as a PCell and a primary cell in a SeNB is named as a PSCell. In new radio (NR) system, a similar DC architecture can be also introduced. In NR-DC, a UE can connect to multiple NR nodes (gNodeB or gNB) including a master gNB (MgNB) and at least one secondary gNB (SgNB or SN). Collectively in this present disclosure hereinafter, a Master Node (MN) is used to describe a MeNB and/or a MgNB; and a Secondary Node (SN) is used to describe a SeNB and a SgNB. Furthermore, serving cells within a MN are grouped together to form a Master Cell Group (MCG), and serving cells within a SN are grouped together to form a Secondary Cell Group (SCG). The MN and the at least one SN of a UE are grouped together to form a Radio Access Network (RAN).

A Protocol Data Unit (PDU) session is established between a core network (CN) and a RAN. The PDU session comprises a Quality of Service Flow (QF). In multi-connectivity, the QF of the PDU session can be further split into at least two separate parts which can be transmitted to the UE through different wireless communication nodes (e.g., MN and SN). The splitting of a QF of a PDU session is determined by the MN of a RAN. GPRS Tunnel Protocol User (GTP-U) Channel, i.e., User Plane (UP) connection, is established between the CN and each of the wireless communication node (e.g., MN and SN) with at least one part of the QF.

In New Radio (NR), a new type of quality of service (QoS) is introduced to meet a demand for delay-sensitive services, such as intelligent transportation systems, dispersed automatic manufacturing systems, etc. The new type of QoS introduced in NR has a high requirement in latency and data packets that are not transmitted within a predefined delay is determined as discarded packets. However, the discarded packets caused by delay can prevent important information from being successfully delivered resulting in serious impacts, e.g., increasing traffic accidents and reducing yield. Currently, a Minimization of Driver Test (MDT) is introduced for network optimization, for example discovering and resolving coverage issues in a wireless communication system. However, the MDT does not collect information of the discarded packets and thus, does not provide accurate estimation of the service quality. Therefore, there exists a need to develop a method and apparatus for a MDT for delay-critical services.

In one embodiment, a method for performing a Minimization of Driver Test (MDT) by a first wireless communication node, includes: receiving a first message from a second wireless communication node; and determining at least one of the following: a data packet discard rate and a packet discard delay according to the first message, wherein the first message comprises a MDT configuration, wherein the MDT configuration indicates a determination of at least one of the following: the data packet discard rate and the packet discard delay, and wherein the MDT configuration comprises at least one of the following: a measurement period and a first Packet Delay Budget (PDB).

In a further embodiment, a method for performing a Minimization of Driver Test (MDT) by a first wireless communication node, includes: transmitting a first message to a second wireless communication node; and receiving a second message from the second wireless communication node, wherein the first message comprises a MDT configuration, wherein the MDT configuration indicates a determination of at least one of the following by the second wireless communication node: a packet discard rate and a packet discard delay, wherein the MDT configuration comprises at least one of the following: a measurement period and a first Packet Delay Budget (PDB), and wherein the second message comprises at least one of the following: the packet discard rate and the packet discard delay.

In a further embodiment, a method for performing a Minimization of Driver Test (MDT) by a wireless communication device, includes: receiving a first message from a wireless communication node; and determining at least one of the following: a data packet discard rate and a packet discard delay according to the first message, wherein the first message comprises a MDT configuration, wherein the MDT configuration indicates a determination of at least one of the following: the data packet discard rate and the packet discard delay, and wherein the MDT configuration comprises a measurement period.

In a further embodiment, a method for performing a Minimization of Driver Test (MDT) by a wireless communication node, includes: transmitting a first message to a wireless communication device; and receiving a second message from the wireless communication device, wherein the first message comprises a MDT configuration, wherein the MDT configuration indicates a determination of at least one of the following by the wireless communication device: a packet discard rate and a packet discard delay, wherein the MDT configuration comprises a measurement period, and wherein the second message comprises at least one of the following: the data packet discard rate and the packet discard delay.

Yet in another embodiment, a computing device comprising at least one processor and a memory coupled to the processor, the at least one processor configured to carry out the method.

Yet, in another embodiment, a non-transitory computer-readable medium having stored thereon computer-executable instructions for carrying out the method.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

Figure 1A:
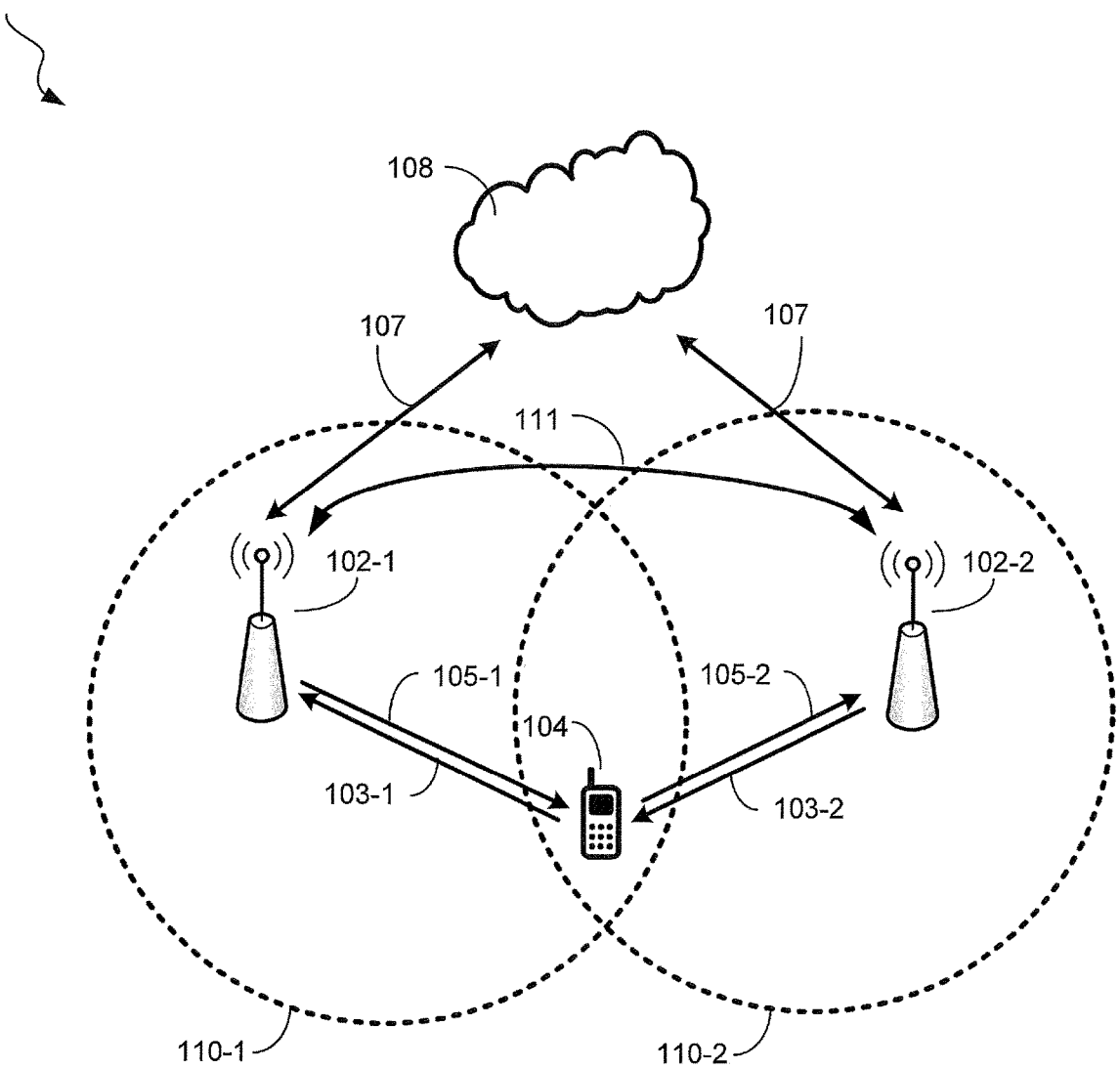
FIG. 1A illustrates an exemplary wireless communication network, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary wireless communication network 100, in accordance with some embodiments of the present disclosure. In a wireless communication system, a network side communication node or a base station (BS) 102 can be a node B, an E-UTRA Node B (also known as Evolved Node B, eNodeB or eNB), a New Generation eNB (ng-eNB), a gNodeB (also known as gNB) in new radio (NR) technology, a pico station, a femto station, or the like. A terminal side communication device or a user equipment (UE) 104 can be a long range communication system like a mobile phone, a smart phone, a personal digital assistant (PDA), tablet, laptop computer, or a short range communication system such as, for example a wearable device, a vehicle with a vehicular communication system and the like. A network communication node and a terminal side communication device are represented by a BS 102 and a UE 104, respectively, and in all the embodiments in this disclosure hereafter, and are generally referred to as "communication nodes" and "communication device" herein. Such communication nodes and communication devices may be capable of wireless and/or wired communications, in accordance with various embodiments of the invention. It is noted that all the embodiments are merely preferred examples, and are not intended to limit the present disclosure. Accordingly, it is understood that the system may include any desired combination of BSs 102 and UEs 104, while remaining within the scope of the present disclosure.

Referring to FIG. 1A, the wireless communication network 100 includes a first BS 102-1, a second BS 102-2, a third BS 102-3, a fourth BS 102-4, and a UE 104. In some embodiments, the UE 104 forms direct communication (i.e., uplink) channels 103-1, 103-2, 103-3, and 103-4 with the first BS 102-1, the second BS 102-2, the third BS 102-3, and the fourth BS 102-4, respectively. In some embodiments, the UE 104 also forms direct communication (i.e., downlink) channels 105-1, 105-2, 105-3, and 105-4 with the first BS 102-1, the second BS 102-2, the third BS 102-3, and the fourth BS 102-4, respectively. The direct communication channels between the UE 104 and a DU of the BS 102 can be through interfaces such as an Uu interface, which is also known as E-UTRAN air interface. In some embodiments, the UE 104 comprises a plurality of transceivers which enables the UE 104 to support multi connectivity so as to receive data simultaneously from the first BS 102-1, the second BS 102-2, the third BS 102-3, and the fourth BS 102-4. The first BS 102-1, the second BS 102-2, the third BS 102-3, and the fourth BS 102-4 each is connected to a core network (CN) 108 on a user plane (UP) through an external interface 107, e.g., an Iu interface, an NG-U interface, or an S1-U interface. In some embodiments, the CN 108 is one of the following: an Evolved Packet Core (EPC) and a 5G Core Network (5GC). In some embodiments, the CN 108 further comprises at least one of the following: Access and Mobility Management Function (AMF), User Plane Function (UPF), and System Management Function (SMF). Only the second BS 102-2 and the third BS 102-3 are directly connected to the CN 108 on a control plane (CP), e.g., an S1-MME interface. In the illustrated embodiment, the second BS 102-2 and the third BS 102-3 each is a Master Node (MN), which is connected to the CN 108 through both the CP and UP; and the first BS 102-1 and the fourth BS 102-4 each is a Secondary Node (SN), which is also connected to the CN 108 through the UP.

When the first BS 102-1 and the second BS 102-2 each is a gNB, the direct communication between the first BS 102-1 and the second BS 102-2 on the UP and CP is through an Xn-U interface and an Xn-C interface, respectively. When the third BS 102-3 and the fourth BS 102-4 each is a gNB, the direct communication between the first BS 102-1 and the second BS 102-2 on the UP and CP is through an Xn-U interface and an Xn-C interface, respectively. The second BS 102-2 and the third BS 102-3 are neighboring BSs. A first serving cell 110-1 is covered by the first BS 102-1; the second serving cell 110-2 is covered by the second BS 102-2; a third serving cell 110-3 is covered by the third BS 102-3; and the fourth serving cell 110-4 is covered by the fourth BS 102-4. In some embodiments, the second cell 110-2 is a primary cell of the NN (i.e., the second BS 102-2), known as PCell, and the first cell 110-1 is a primary cell of the SN (i.e., the first BS 102-1), known as PSCell. In some embodiments, the first cell 110-1 and the second cell 110-2 are neighboring cells.

A direct communication channel 111 between the first BS 102-1 (eNB) and the second 102-2 (gNB) is through an X2 interface. Similarly, the direct communication channels 111 between the second and the third BS, the third and the fourth BS, the fourth and the first BS can be an X2 interface or an Xn interface. In some embodiments, a BS (gNB) is split into a Distributed Unit (DU) and a Central Unit (CU) on the UP, between which the direct communication is through a F1-U interface. In some embodiments, a CU of the second BS 102-2 can be further split into a Control Plane (CP) and a User Plane (UP), between which the direct communication is through an E1 interface. Hereinafter in the present disclosure, an Xx interface is used to describe one of the following interfaces, the NG interface, the S1 interface, the X2 interface, the Xn interface, the F1 interface, and the E1 interface. When an Xx interface is established between two nodes, the two nodes can transmit control signaling on the CP and/or data on the UP.

Figure 1B:
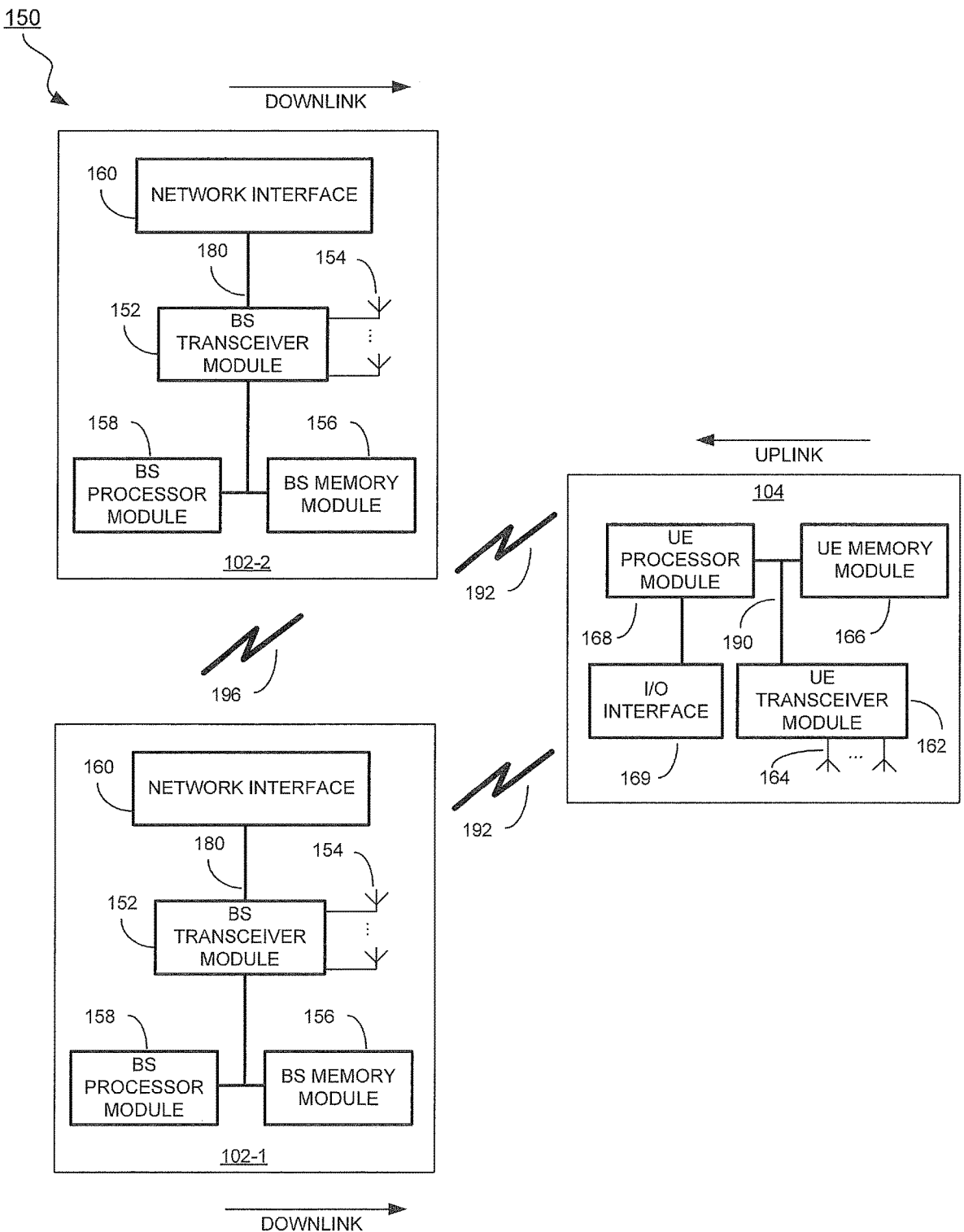
FIG. 1B illustrates a block diagram of an exemplary wireless communication system, in accordance with some embodiments of the present disclosure.

FIG. 1B illustrates a block diagram of an exemplary wireless communication system 150, in accordance with some embodiments of the present disclosure. The system 150 may include components and elements configured to support known or conventional operating features that need not be described in detail herein. In some embodiments, the system 150 can be used to transmit and receive data symbols in a wireless communication environment such as the wireless communication network 100 of FIG. 1A, as described above.

The system 150 generally includes a first BS 102-1, a second BS 102-2, and a UE 104, collectively referred to as BS 102 and UE 104 below for ease of discussion. The first BS 102-1 and the second BS 102-2 each comprises a BS transceiver module 152, a BS antenna array 154, a BS memory module 156, a BS processor module 158, and a network interface 160. In the illustrated embodiment, each module of the BS 102 are coupled and interconnected with one another as necessary via a data communication bus 180. The UE 104 comprises a UE transceiver module 162, a UE antenna 164, a UE memory module 166, a UE processor module 168, and an I/O interface 169. In the illustrated embodiment, each module of the UE 104 are coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, the system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink (UL) transmission, and a wireless transmission from a transmitting antenna of the BS 102 to a receiving antenna of the UE 104 is known as a downlink (DL) transmission. In accordance with some embodiments, the UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. Preferably, there is close synchronization timing with only a minimal guard time between changes in duplex direction. The UE transceiver 162 communicates through the UE antenna 164 with the BS 102 via the wireless communication channel 192. The BS transceiver 152 communications through the BS antenna 154 of a BS (e.g., the first BS 102-1) with the other BS (e.g., the second BS 102-2) via a wireless communication channel 196. The wireless communication channel 196 can be any wireless channel or other medium known in the art suitable for direct communication between BSs.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some exemplary embodiments, the UE transceiver 162 and the BS transceiver 152 are configured to support industry standards such as the Long Term Evolution (LTE) and emerging 5G standards (e.g., NR), and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The processor modules 158 and 168 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor module may be realized as a microprocessor, a controller, a microcontroller, a state machine, or the like. A processor module may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. The memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or a CN over a wired or wireless connection.

Referring again to FIG. 1A, as mentioned above, the BS 102 repeatedly broadcasts system information associated with the BS 102 to one or more UEs 104 so as to allow the UEs 104 to access the network within the cells (e.g., 110-1 for the first BS 102-1 and 110-2 for the second BS 102-2) where the BS 102 is located, and in general, to operate properly within the cell. Plural information such as, for example, downlink and uplink cell bandwidths, downlink and uplink configuration, cell information, configuration for random access, etc., can be included in the system information, which will be discussed in further detail below. Typically, the BS 102 broadcasts a first signal carrying some major system information, for example, configuration of the cell 110 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)).

Referring again to FIG. 1B, in some embodiments, the major system information carried by the first broadcast signal may be transmitted by the BS 102 in a symbol format via the communication channel 192 (e.g., a PBCH). In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

Figure 2:
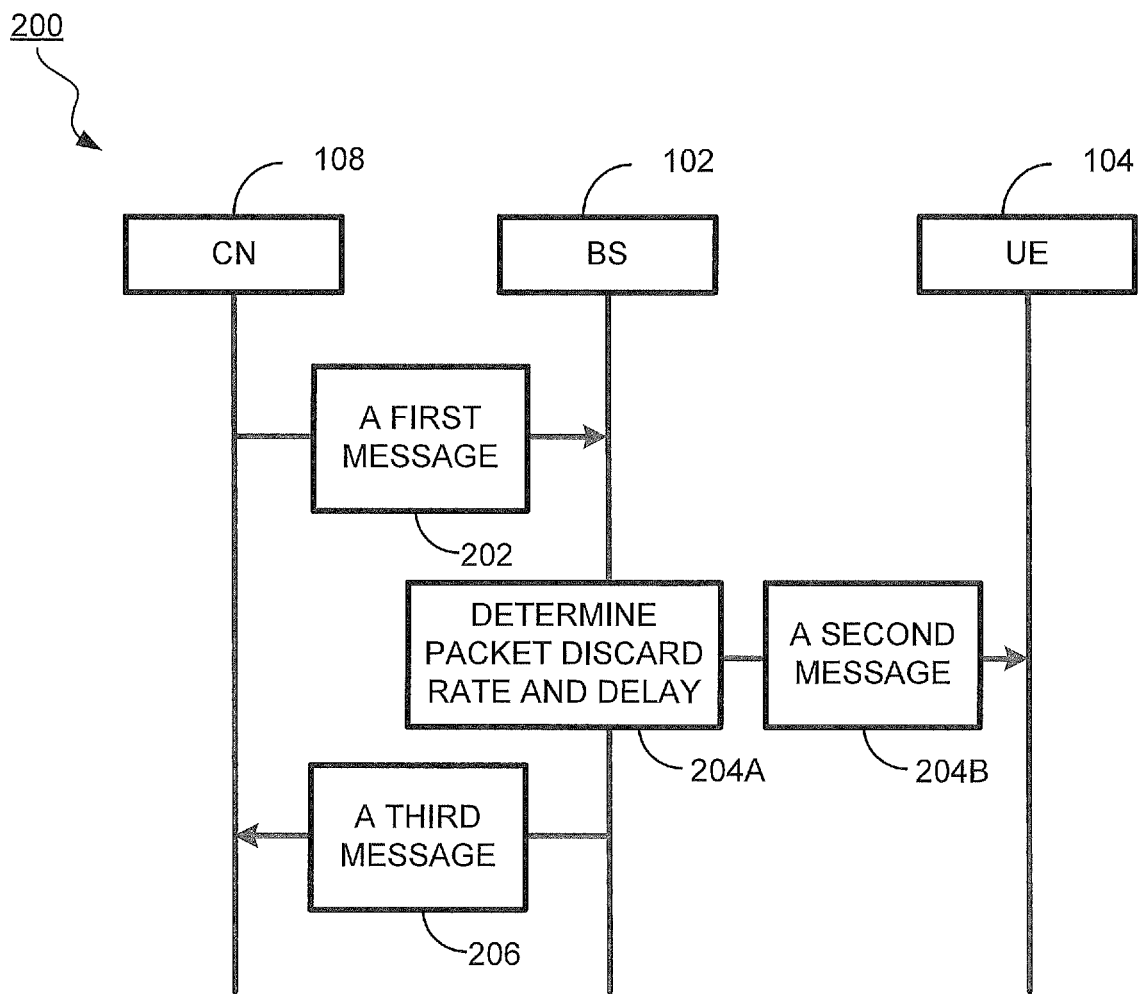
FIG. 2 illustrates a method for minimization of drive tests (MDT) in a wireless communication system, in accordance with some embodiments of the present disclosure.

FIG. 2 illustrates a method 200 for performing Minimization of Drive Tests in delay-critical services, in accordance with some embodiments of the present disclosure. It is understood that additional operations may be provided before, during, and after the method 200 of FIG. 2, and that some operations may be omitted or reordered. The communication system in the illustrated embodiment comprises a BS 102, a UE 104, and a CN 108. In the illustrated embodiments, the UE 104 is in one of at least one serving cell covered by the BS 102, i.e., the UE 104 is in connection with the BS 102. In the illustrated embodiments, the BS 102 has combined CU and DU. In some embodiments, the BS 102 is one of the following: a Master Node (MN) and a Secondary Node (SN). Furthermore, all serving cells within the BS 102 are grouped together to form a Master Cell Group (MCG) when the BS 102 is a MN, and all serving cells within the second BS 102-2 are grouped together to form a Secondary Cell Group (SCG) when the BS 102 is a SN. Packets for MDT can be carried by the BS 102 are one of the following: MCG bearers and SCG bearers. FIG. 2 is for illustration purposes and is not intend to be limiting. It should be noted that that any numbers of BS 102 can be used, which is within the scope of this invention.

The method 200 starts with operation 202 in which a first message is received by the BS 102 from the CN 108 according to some embodiments. In some embodiments, the first message is transmitted on a S1 or NG interface on the CP. In some embodiments, the first message is one of the following: an initial UE message and an Operation and Maintenance (OAM) command. In some embodiments the first message comprises a configuration of MDT for measuring packet discard rate and packet discard delay in a delay-critical QoS. In some embodiments, the first message is transmitted from the CN 108 to the BS 102 through an AMF of the CN 108. In some embodiments, the first message is received by the BS 102 from a network element (e.g., an OAM device). In some embodiments, the first message is used to indicate that a measurement of at least one of the following is required: a packet discard rate and a packet discard delay. In some embodiments, the configuration of MDT comprises at least one of the following: a measurement period, and a default PDB. In some embodiments, the measurement period is 10 seconds and the default PDB is one of the following: 23 milliseconds and 34 milliseconds. In some embodiments, the configuration of MDT is carried as an Information Element (IE) of the first message.

The method 200 continues with operation 204 in which a packet discard rate and a packet discard delay are determined by the BS 102 according to some embodiments. In some embodiments, the packet discard rate and the packet discard delay are determined (204A), during the transmission (204B) of a second message from the BS 102 to the UE 104. In some embodiments, the second message is transmitted through a Uu interface on the UP from the BS 102 to the UE 104. In some embodiments, the second message comprises at least one Protocol Data Unit (PDU) in a MAC layer. In some embodiments, the at least one PDU comprises downlink (DL) data packets. In some embodiments, the BS 102 determines the packet discard rate and packet discard delay based on a Hybrid Automatic Repeat Request (HARQ) procedure.

In some embodiments, the packet discard rate is a ratio between a number of packets that are discarded in the second message and a total number of packets in the second message. In some embodiments, the packet discard delay is an average delay of a packet after being submitted to a corresponding layer in the measurement period before being determined as a discarded packet. In some embodiments, the packets each is one of the following: IP packets submitted to a Service Data Adaptation Protocol (SDAP) layer, SDAP packets submitted to a Packet Data Convergence Protocol (PDCP) layer, and PDCP packets submitted to a Radio Link Control (RLC) layer. In some embodiments, the packets that are discarded, herein after discarded packets, is the packets in the second message that are not successfully transmitted within a critical PDB after being submitted to a corresponding layer. For example, discarded IP packets are the IP packets that are not successfully transmitted within the critical PDB after being submitted to the SDAP layer. Similarly, discarded SDAP packets are the SDAP packets that are not being successfully transmitted within the critical PDB after being submitted to the PDCP layer; and discarded PDCP packets are the PDCP packets that are not being successfully transmitted within the critical PDB after being submitted to the RLC layer.

In some embodiments, the critical PDB is determined by the BS 102 as a time difference between a PDB of the delay-critical QoS (e.g., a QoS with a 5QI) and a transmission delay from the UPF of the CN 108 to the BS 102. In some embodiments, the at least one delay-critical QoS each is a 5G QoS with a 5QI value of 82, 83, 84, and 85. For example, when the PDB corresponding to the 5QI is 30 milliseconds and the transmission delay from the UPF of the CN 108 to the BS 102 is 5 milliseconds, the critical PDB is 25 milliseconds. In some other embodiments, the critical PDB is the default PDB configured by the CN 108 for the BS 102 in the first message.

In some embodiments, a discarded packet (e.g., a discarded IP packet, a discarded SDAP packet, and a discarded PDCP packet) is one of the following: a first packet which is actually discarded from being transmitted, and a second packet which is labeled as discarded but continuously being transmitted.

In some embodiments, the packets (i.e., IP packets, SDAP packets, and PDCP packets) when being transmitted in the MAC layer, are segmented into a plurality of RLC segments. In some embodiments, when all of the plurality of RLC segments of a packets are not transmitted to the UE 104 from the BS 102 within the critical PDB, the packet is determined as an unsuccessfully transmitted packet and thus a discarded packet. For example, when a packet is in a queue for transmission and the plurality of RLC segments of the packet are not being transmitted from the BS 102 to the UE 104 on the air interface within the critical PDB, the packet is determined as a discarded packet. For another example, when only a part of the plurality of RLC segments of the packet is transmitted from the BS 102 to the UE 104 within the critical PDB, the packet is determined as a discarded packet. For another example, when a part of the plurality of RLC segments of the packet is transmitted from the BS 102 to the UE 104 with in the critical PDB, and when a processing delay by the UE 104 and a transmission delay of the rest of the plurality of RLC segments are both considered, a transmission of the rest of the plurality of RLC segments is determined to be over the critical PDB, the packet is determined as a discarded packet. For another example, when a re-transmission of at least one of the plurality of RLC segments is over the critical PDB, the packet is determined as a discarded packet.

The method 200 continues with operation 206 in which a third message is transmitted from the BS 102 to the CN 108 according to some embodiments. In some embodiments, the third message comprises the packet discard rate and the packet discard delay determined during the operation 204. In some embodiments, the third message is transmitted when the measurement period configured in the first message is terminated. In some embodiments, the third message is transmitted from the BS 102 to the network management system, e.g., a trace-collection entity (TCE).

Figure 3:
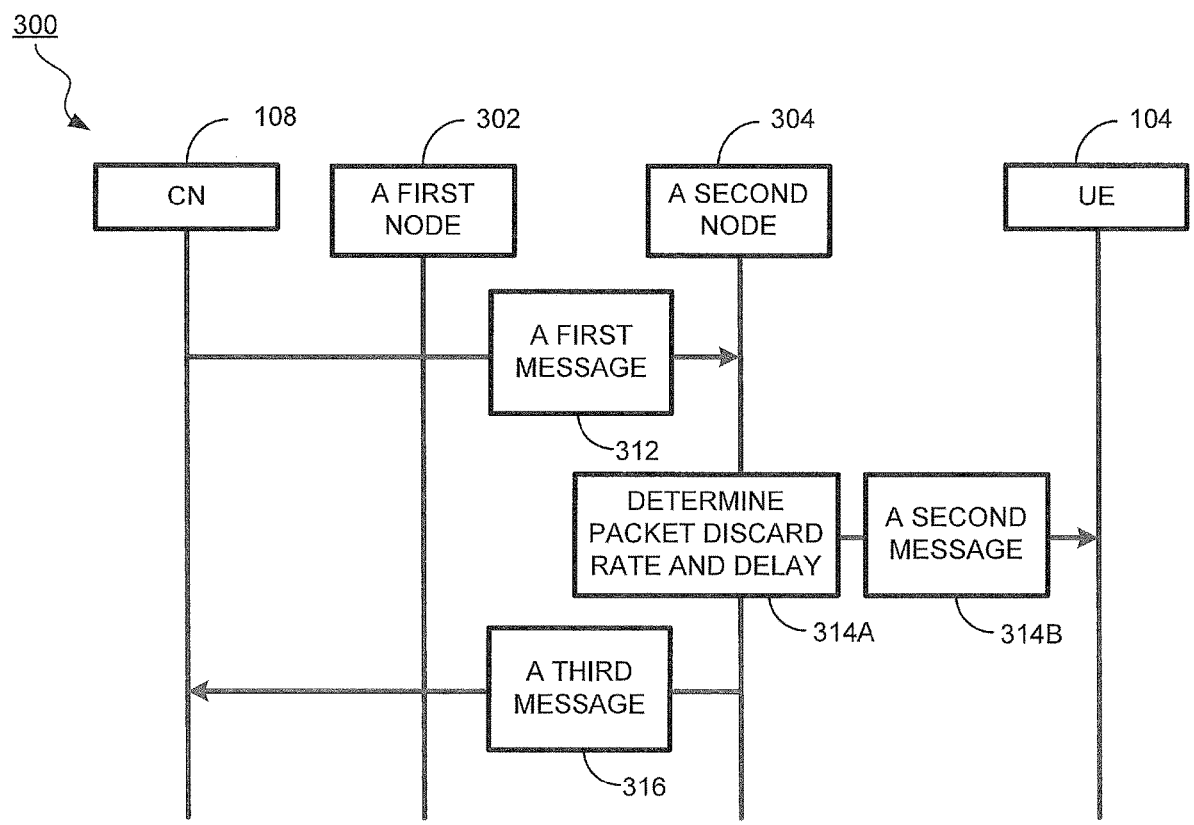
FIG. 3 illustrates a method for minimization of drive tests (MDT) in a wireless communication system, in accordance with some embodiments of the present disclosure.

FIG. 3 illustrates a method 300 for performing Minimization of Drive Tests in delay-critical services, in accordance with some embodiments of the present disclosure. It is understood that additional operations may be provided before, during, and after the method 300 of FIG. 3, and that some operations may be omitted or reordered. The communication system in the illustrated embodiment comprises a CN 108, a first node 302, a second node 304, and a UE 104. In some embodiments, the first node is a first unit of a BS 102, i.e., a CU and a second node is a second unit of the BS 102, i.e., DU. In this case, the UE 104 is in one of at least one serving cell covered by the BS 102, i.e., the UE 104 is in connection with the BS 102. In some other embodiments, the first node 302 is a first BS and a second node 304 is a second BS. In this case, the UE 104 is in one of at least one serving cell covered by the first BS and in one of the at least one serving cell covered by the second BS, i.e., the UE 104 is in connection with the first BS and in connection with the second BS. In the illustrated embodiments, the first node 302 is a Master Node (MN); and the second node 304 is a Secondary Node (SN). Furthermore, all serving cells within the first node 302 are grouped together to form a Master Cell Group (MCG), and all serving cells within the second node 304 are grouped together to form a Secondary Cell Group (SCG). Data packets are carried by a split bearer. In the illustrated embodiment, the first node 302 comprises a SDAP layer and a PDCP layer and the second node 304 comprises a RLC layer and a MAC layer. FIG. 3 is for illustration purposes and is not intend to be limiting. It should be noted that that any numbers of BS 102 can be used, which is within the scope of this invention.

The method 300 starts with operation 312 in which a first message is received by the second node 304 according to some embodiments. In some embodiments, the first message is received by the second node 304 from one of the following: the CU 102A and a network management system (e.g., an O/M device). In some embodiments, the first message is one of the following: a UE context setup message and a UE context modification message. In some embodiments, the first message is transmitted on the CP through one of the following: a F1 interface, a S1 interface and an NG interface. In some embodiments, the first message is used to indicate that a measurement of at least one of the is required: a packet discard rate and a packet discard delay. In some embodiments, the configuration of MDT comprises at least one of the following: a measurement period, and a default PDB. In some embodiments, the measurement period is 10 seconds and the default PDB is one of the following: 23 milliseconds and 34 milliseconds. In some embodiments, the configuration of MDT is carried as an IE of the first message.

The method 300 continues with operation 314 in which a packet discard rate and a packet discard delay are determined by the second node 304 according to some embodiments. In some embodiments, the packet discard rate and the packet discard delay are determined during operation 304A, while a second message is transmitted during operation 304B from the second node 304 to the UE 104. In some embodiments, the second message is transmitted through a Uu interface on the UP from the second node 304 to the UE 104. In some embodiments, the second message comprises at least one Protocol Data Unit (PDU) in a MAC layer. In some embodiments, the at least one PDU in the second message comprises DL data packets. In some embodiments, the second node 304 determines the packet discard rate and packet discard delay based on a Hybrid Automatic Repeat Request (HARQ) procedure.

In some embodiments, the packet discard rate is a ratio between a number of data packets that are discarded in the second message and a total number of data packets in the second message. In some embodiments, the packet discard delay is an average delay of a data packet after being submitted from the first node 302 to the second node 304 through the F1-U or the Xn-U interface and eventually to the RLC layer before being determined as a discarded packet within the measurement period. In some embodiments, the data packets are PDCP packets submitted to a Radio Link Control (RLC) layer. In some embodiments, the data packets that are discarded, herein after discarded packets, is the data packets in the second message that are not successfully transmitted within a critical PDB after being submitted to a corresponding layer. Specifically, discarded PDCP packets are the PDCP packets that are not being successfully transmitted within the critical PDB after being submitted to the RLC layer. In some embodiments, the data packets (i.e., PDCP packets) are packets of at least one delay-critical QoS. In some embodiments, the at least one delay-critical QoS each is a 5G QoS with a 5QI value of 82, 83, 84, and 85.

In some embodiments, the critical PDB is determined as a first time difference between a PDB corresponding to a 5QI and a total transmission delay. In some embodiments, the total transmission delay comprises at least one of the following: a first delay from the first node 302 with the PDCP layer to the second node 304 with the RLC layer and a second delay from the UPF of the CN 108 to the first node 302. In some embodiments, the first delay from the first node 302 to the second node 304 can be one of the following: determined by a second time difference and configured by the network management system. In some embodiments, the second time difference is between a first time when the PDCP packets is submitted to the second node 304 from the first node 302 and a second time when the PDCP packets is received by the second node 304 on a GPRS Tunneling Protocol (GTP) tunnel on the UP (GTP-U tunnel) and submitted to a queue. In some embodiments, the first delay is configured with an average delay, e.g., 2 milliseconds. For example, when the PDB corresponding to the 5QI is 30 milliseconds, the first delay between the first network element and the second network element is 2 milliseconds and the second delay from the UPF of the CN 108 to the first node 302 is 5 milliseconds, the critical PDB is 23 milliseconds.

In some embodiments, the data packets (i.e., PDCP packets) when being transmitted in the MAC layer, are segmented into a plurality of RLC segments. In some embodiments, when all of the plurality of RLC segments of a packets are not transmitted to the UE 104 from the BS 102 within the critical PDB, the packet is determined as an unsuccessfully transmitted packet and thus a discarded packet. For example, when a packet is in a queue for transmission and the plurality of RLC segments of the packet are not being transmitted from the BS 102 to the UE 104 on the air interface within the critical PDB, the packet is determined as a discarded packet. For another example, when only a part of the plurality of RLC segments of the packet is transmitted from the BS 102 to the UE 104 within the critical PDB, the packet is determined as a discarded packet. For another example, when a part of the plurality of RLC segments of the packet is transmitted from the BS 102 to the UE 104 with in the critical PDB, and when a processing delay by the UE 104 and a transmission delay of the rest of the plurality of RLC segments are both considered, a transmission of the rest of the plurality of RLC segments is determined to be over the critical PDB, the packet is determined as a discarded packet. For another example, when a re-transmission of at least one of the plurality of RLC segments is over the critical PDB, the packet is determined as a discarded packet.

The method 300 continues with operation 316 in which a third message is transmitted from the second node 304 according to some embodiments. In some embodiments, the third message is transmitted to one of the following: the CU 102A and the network management system (not shown), e.g., a trace-collection entity (TCE). In some embodiments, the third message comprises the packet discard rate and the packet discard delay determined during the operation 304A. In some embodiments, the third message is transmitted when the measurement period is terminated.

Figure 4:
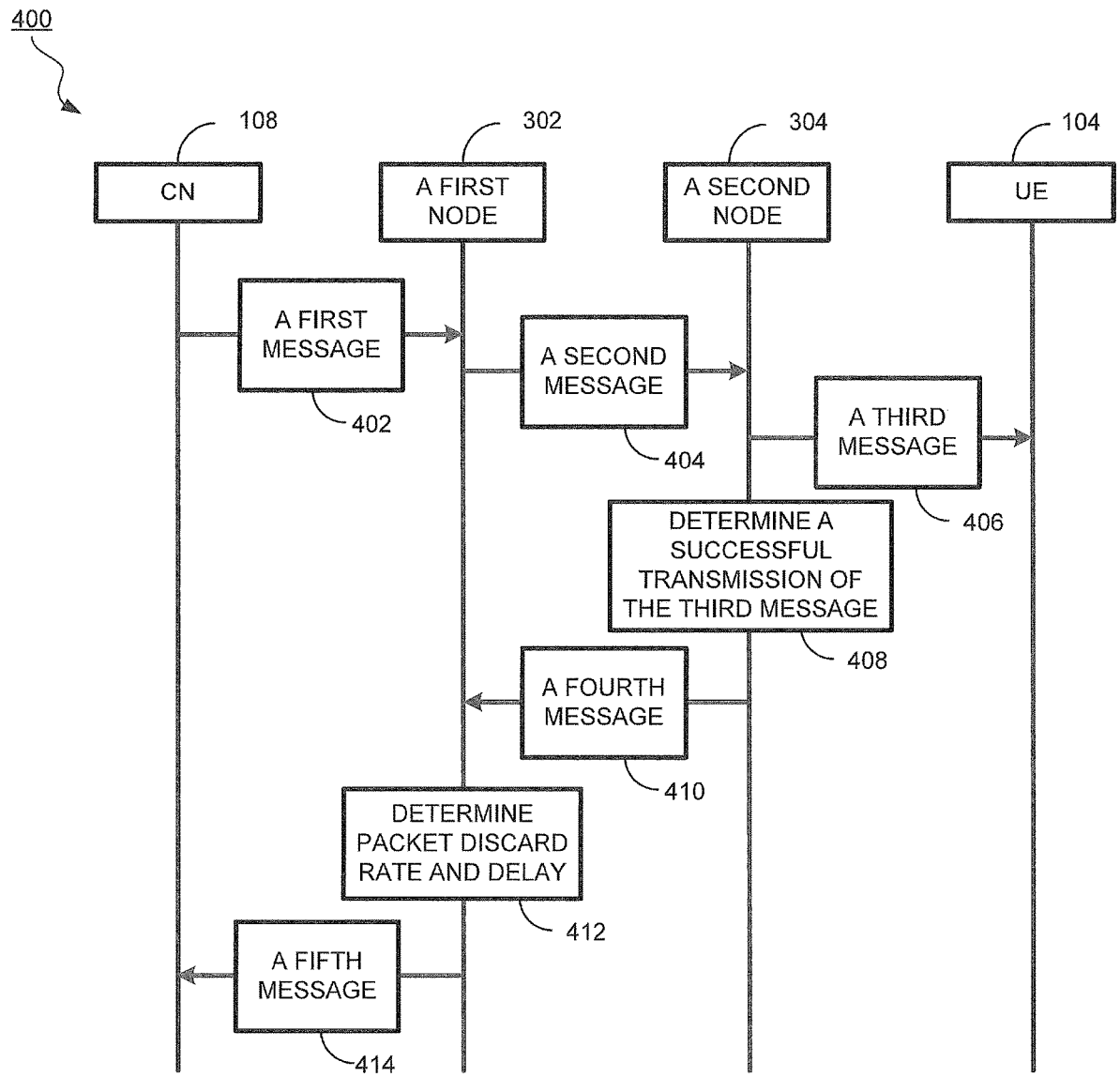
FIG. 4 illustrates a method for minimization of drive tests (MDT) in a wireless communication system, in accordance with some embodiments of the present disclosure.

FIG. 4 illustrates a method 400 for performing Minimization of Drive Tests in delay-critical services, in accordance with some embodiments of the present disclosure. It is understood that additional operations may be provided before, during, and after the method 400 of FIG. 4, and that some operations may be omitted or reordered. The communication system in the illustrated embodiment comprises a CN 108, a first node 302, a second node 304, and a UE 104. In some embodiments, the first node is a first unit of a BS 102, i.e., a CU and a second node is a second unit of the BS 102, i.e., DU. In this case, the UE 104 is in one of at least one serving cell covered by the BS 102, i.e., the UE 104 is in connection with the BS 102. In some other embodiments, the first node 302 is a first BS and a second node 304 is a second BS. In this case, the UE 104 is in one of at least one serving cell covered by the first BS and in one of the at least one serving cell covered by the second BS, i.e., the UE 104 is in connection with the first BS and in connection with the second BS. In the illustrated embodiments, the first node 302 is a Master Node (MN); and the second node 304 is a Secondary Node (SN). Furthermore, all serving cells within the first node 302 are grouped together to form a Master Cell Group (MCG), and all serving cells within the second node 304 are grouped together to form a Secondary Cell Group (SCG). Data packets are carried by a split bearer. In the illustrated embodiment, the first node 302 comprises a SDAP layer and a PDCP layer and the second node 304 comprises a RLC layer and a MAC layer. FIG. 4 is for illustration purposes and is not intend to be limiting. It should be noted that that any numbers of BS 102 can be used, which is within the scope of this invention.

The method 400 starts with operation 402 in which a first message is received by the first node 302 according to some embodiments. In some embodiments, the first message is received by the first node 302 from one of the following: the network management system (not shown) and an AMF of the CN 108. In some embodiments, the first message is transmitted on a S1 or NG interface on the CP. In some embodiments, the first message is one of the following: an initial UE message and an Operation/Maintenance (OAM) commend. In some embodiments the first message comprises a configuration of MDT for measuring packet discard rate and packet discard delay in a delay-critical QoS. In some embodiments, the first message is transmitted from the CN 108 to the first node 302 through the AMF of the CN 108. In some embodiments, the first message is received by the first node 302 from a network element (e.g., an OAM device). In some embodiments, the first message is used to indicate that a measurement of at least one of the following is required: a packet discard rate and a packet discard delay. In some embodiments, the configuration of MDT comprises at least one of the following: a measurement period, and a default PDB. In some embodiments, the measurement period is 10 seconds and the default PDB is one of the following: 23 milliseconds and 34 milliseconds. In some embodiments, the configuration of MDT is carried as an Information Element (IE) of the first message. In some embodiments, the first message further comprises DL data packets that are scheduled to be transmitted to the UE 104, wherein the DL data packets each is one of the following: an IP packet, a SDAP packet, and a PDCP packet. In some other embodiments, the data packets are received by the first node 302 in a separate message. In some embodiments, a first time is determined by the first node 302 when the data packets are received.

The method 400 continues with operation 404 in which a second message is transmitted from the first node 302 to the second node 304 according to some embodiments. In some embodiments, the second message is transmitted on the UP through one of the following: a F1 interface and an Xn interface. In some embodiments, the second message comprises a plurality of DL USER DATA packets. In some embodiments, the second message comprises a DL report NR PDCP PDU SN, wherein the DL report NR PDCP PDU SN is used to indicate a PDCP index of a first packet of the plurality of DL USER DATA packets that is required to be reported, when the first packet is determined as a discarded packet.

The method 400 continues with operation 406 in which a third message is transmitted from the second node 304 to the UE 104 according to some embodiments. In some embodiments, the third message is transmitted on the UP through a Uu interface. In some embodiments, the third message comprises at least one Protocol Data Unit (PDU) in a MAC layer. In some embodiments, the at least one PDU comprises downlink (DL) data packets. In some embodiments, the data packets (i.e., PDCP packets) when being transmitted in the MAC layer, are segmented into a plurality of RLC segments. In some embodiments, the at least one PDU is transmitted in a HARQ process.

The method 400 continues with operation 408 in which whether the third message is successfully transmitted to the UE 104 is determined by the second node 304 according to some embodiments. In some embodiments, the successfully transmission of the third message from the second node 304 to the UE 104 is determined according to a feedback step in the HARQ process.

The method 400 continues with operation 410 in which a fourth message is received by the first node 302 from the second node 304 according to some embodiments. In some embodiments, the fourth message is transmitted from the second node 304 to the first node 302 on the UP. In some embodiments, the fourth second message is a DL DATA DELIVERY STATUS message. In some embodiments, the fourth message comprises information of a transmission of the first data packet with the PDCP index indicated to be reported in the second message. For example, when the first data packet with the PDCP index indicated in the second message is determined to be successfully transmitted from the second node 304 to the UE 104, the fourth message is used by the second node 304 to indicate the first node 302 the successful transmission of the first packet. Similarly, when the transmission of the first data packet with the PDC index indicated in the second message is determined to be failed, the fourth message is used by the second node to indicate the first node 302 the failure transmission of the first packet. In some embodiments, the second message comprises a special UP data frame. In some embodiments, the fourth message is received by the first node 302 at a second time.

The method 400 continues with operation 412 in which a packet discard rate and a packet discard delay are determined by the first node 302 according to some embodiments. In some embodiments, the packet discard rate and the packet discard delay are determined according to the fourth message. In some embodiments, the packet discard rate is a ratio between a number of data packets that are discarded in the second message and a total number of data packets in the second message. In some embodiments, the packet discard delay is an average delay of a data packet after being submitted to a corresponding layer in the measurement period before being determined as a discarded packet. In some embodiments, the data packets are one of the following: IP packets submitted to a Service Data Adaptation Protocol (SDAP) layer, SDAP packets submitted to a Packet Data Convergence Protocol (PDCP) layer, and PDCP packets submitted to a Radio Link Control (RLC) layer. In some embodiments, the data packets that are discarded, herein after discarded packets, each is a discarded first data packet which is indicated in the second message. In some other embodiments, the packets that are discarded, herein after discarded packets, is the packets in the second message that are not successfully transmitted within a critical PDB after being submitted to a corresponding layer. For example, discarded IP packets are the IP packets that are not successfully transmitted within the critical PDB after being submitted to the SDAP layer. Similarly, discarded SDAP packets are the SDAP packets that are not being successfully transmitted within the critical PDB after being submitted to the PDCP layer; and discarded PDCP packets are the PDCP packets that are not being successfully transmitted within the critical PDB after being submitted to the RLC layer.

In some embodiments, the critical PDB is determined as a time difference between a PDB corresponding to a 5QI and a total transmission delay. In some embodiments, the total transmission delay comprises at least one of the following: a first delay from the first node 302 with the PDCP layer to the second node 304 with the RLC layer and a second delay from the UPF of the CN 108 to the first node 302. In some embodiments, the first delay from the CU 102A to the DU 102B can be one of the following: determined by a time difference and configured by the network management system. In some embodiments, the time difference is between a first time when the PDCP packets is submitted to the second node 304 from the first node 302 and a second time when the PDCP packets is received by the second node 304 on a GPRS Tunneling Protocol (GTP) tunnel on the UP (GTP-U tunnel) and submitted to a queue. In some embodiments, the first delay is configured with an average delay, e.g., 2 milliseconds.

In some embodiments, when a time difference between the first time and the second time is greater the critical PDB, the packet is determined as a discarded packet. In some embodiments, the data packets (i.e., IP packets, SDAP packets, and PDCP packets) when being transmitted in the MAC layer, are segmented into a plurality of RLC segments. In some embodiments, when all of the plurality of RLC segments of a data packets are not transmitted to the UE 104 from the BS 102 within the critical PDB, the data packet is determined as an unsuccessfully transmitted packet and thus a discarded packet. For example, when a packet is in a queue for transmission and the plurality of RLC segments of the packet are not being transmitted from the BS 102 to the UE 104 on the air interface within the critical PDB, the packet is determined as a discarded packet. For another example, when only a part of the plurality of RLC segments of the packet is transmitted from the BS 102 to the UE 104 within the critical PDB, the packet is determined as a discarded packet. For another example, when a part of the plurality of RLC segments of the packet is transmitted from the BS 102 to the UE 104 with in the critical PDB, and when a processing delay by the UE 104 and a transmission delay of the rest of the plurality of RLC segments are both considered, a transmission of the rest of the plurality of RLC segments is determined to be over the critical PDB, the packet is determined as a discarded packet. For another example, when a re-transmission of at least one of the plurality of RLC segments is over the critical PDB, the packet is determined as a discarded packet.

The method 400 continues with operation 414 in which a fifth message is transmitted from the first node 302 according to some embodiments. In some embodiments, the fifth message comprises the packet discard rate and the packet discard delay determined during the operation 412. In some embodiments, the fifth message is transmitted when the measurement period is terminated. In some embodiments, the fifth message is transmitted from the first node 302 to one of the following: the network management system (not shown), e.g., a trace-collection entity (TCE), and the CN 108.

Figure 5:
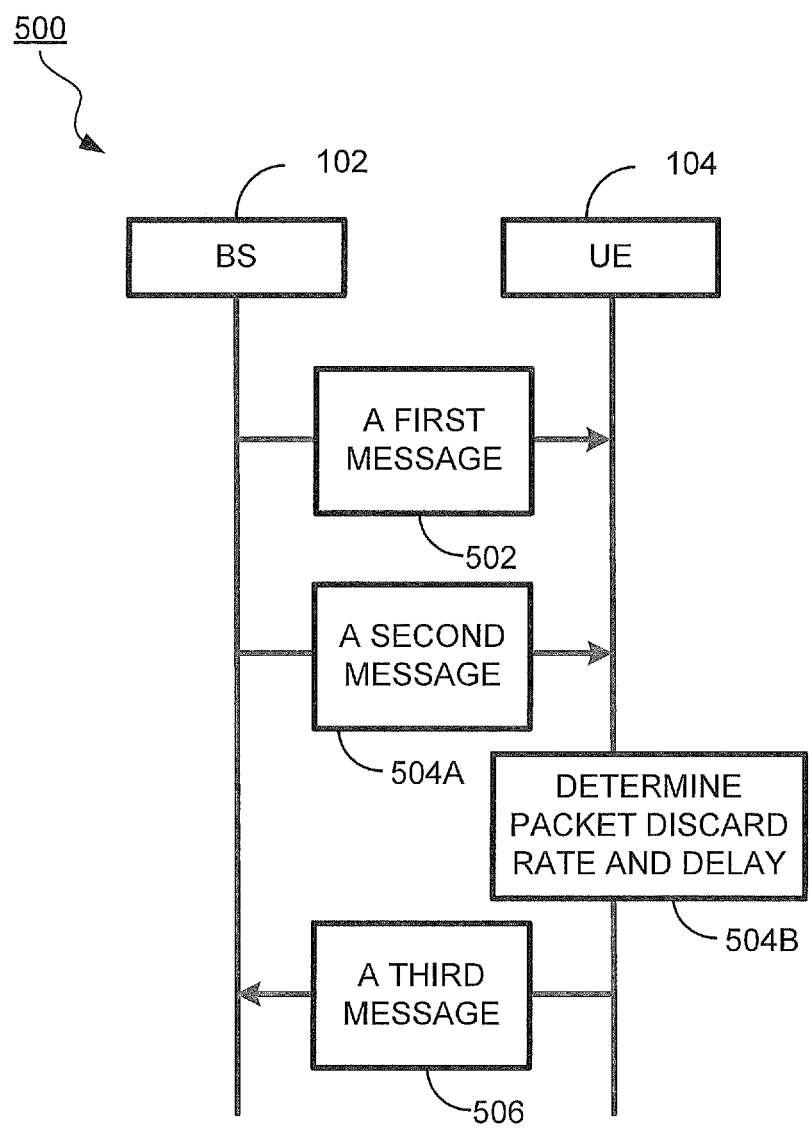
FIG. 5 illustrates a method for minimization of drive tests (MDT) in a wireless communication system, in accordance with some embodiments of the present disclosure.

FIG. 5 illustrates a method 500 for performing Minimization of Drive Tests in delay-critical services, in accordance with some embodiments of the present disclosure. It is understood that additional operations may be provided before, during, and after the method 500 of FIG. 5, and that some operations may be omitted or reordered. The communication system in the illustrated embodiment comprises a BS 102, and a UE 104. In the illustrated embodiments, the UE 104 is in one of at least one serving cell covered by the BS 102, i.e., the UE 104 is in connection with the BS 102. In the illustrated embodiments, the BS 102 has combined CU and DU. In some embodiments, the BS 102 is one of the following: a Master Node (MN) and a Secondary Node (SN). Furthermore, all serving cells within the BS 102 are grouped together to form a Master Cell Group (MCG) when the BS 102 is a MN, and all serving cells within the second BS 102-2 are grouped together to form a Secondary Cell Group (SCG) when the BS 102 is a SN. Packets for MDT can be carried by the BS 102 are one of the following: MCG bearers and SCG bearers. FIG. 5 is for illustration purposes and is not intend to be limiting. It should be noted that that any numbers of BS 102 can be used, which is within the scope of this invention.

The method 500 starts with operation 502 in which a first message is received by the UE 104 from the BS 102 according to some embodiments. In some embodiments, the first message is a Radio Resource Control (RRC) message and transmitted through the Xn interface on the CP. In some embodiments, the first message is an RRCreconfiguration message. In some embodiments the first message comprises a configuration of MDT for measuring packet discard rate and packet discard delay in delay-critical downlink transmission of data packets. In some embodiments, the first message is received by the UE 104 from a network element (e.g., a network management system). In some embodiments, the first message is used to indicate that a measurement of at least one of the following is required: a packet discard rate and a packet discard delay. In some embodiments, the configuration of MDT comprises a measurement period. In some embodiments, the measurement period is 10 seconds and the default PDB is one of the following: 23 milliseconds and 34 milliseconds. In some embodiments, the configuration of MDT is carried as an Information Element (IE) of the first message.

The method 500 continues with operation 504A in which a second message is transmitted from the BS 102 to the UE 104 according to some embodiments. In some embodiments, the second message is transmitted through a Uu interface on the UP from the BS 102 to the UE 104. In some embodiments, the second message comprises at least one Protocol Data Unit (PDU) in a MAC layer. In some embodiments, the at least one PDU comprises downlink (DL) data packets. In some embodiments, the DL data packets each is one of the following packets: an IP packet, a SDAP packet, and a PDCP packet. During the operation 504, the method 500 continues with operation 504B in which a packet discard rate and a packet discard delay are determined by the UE 104 according to some embodiments.

In some embodiments, the packet discard rate is a ratio between a number of packets that are discarded in the second message and a total number of packets in the second message. In some embodiments, the packet discard delay is an average delay of a packet after being submitted to a corresponding higher layer in the measurement period before being determined as a discarded packet. In some embodiments, the packets is one of the following: SDAP packets submitted to an IP layer, and PDCP packets submitted to a SDAP layer. In some embodiments, the packets that are discarded, herein after discarded packets, is the packets in the second message that are not successfully submitted to a corresponding higher layer after being received from the BS 102. For example, discarded SDAP packets are the SDAP packets that are not successfully submitted to the IP layer within the UE critical PDB; and discarded PDCP packets are the PDCP packets that are not successfully submitted to the SDAP layer within the UE critical PDB. In some embodiments, the total number of packets comprises the discarded packets and packets that are successfully received and submitted to a corresponding higher layer.

In some embodiments, the UE critical PDB is determined according to one of the following: a PDB of a delay-critical QoS (i.e., a QoS with a 5QI) and a difference between a PDB of a delay-critical QoS and a first processing delay. In some embodiments, the first processing delay is a processing delay on the BS 102. For example, when a PDB of a delay-critical QoS is 30 milliseconds and a first processing delay is 10 milliseconds, a UE critical PDB is determined as 20 milliseconds. In some other embodiments, the UE critical PDB is configured in the first message and the UE critical PDB is the default PDB.

The method 500 continues with operation 506 in which a third message is transmitted from the UE 104 according to some embodiments. In some embodiments, the third message comprises the packet discard rate and the packet discard delay determined during the operation 504B. In some embodiments, the third message is transmitted when the measurement period is terminated. In some embodiments, the third message is transmitted from the UE 104 to the BS 102.

Figure 6:
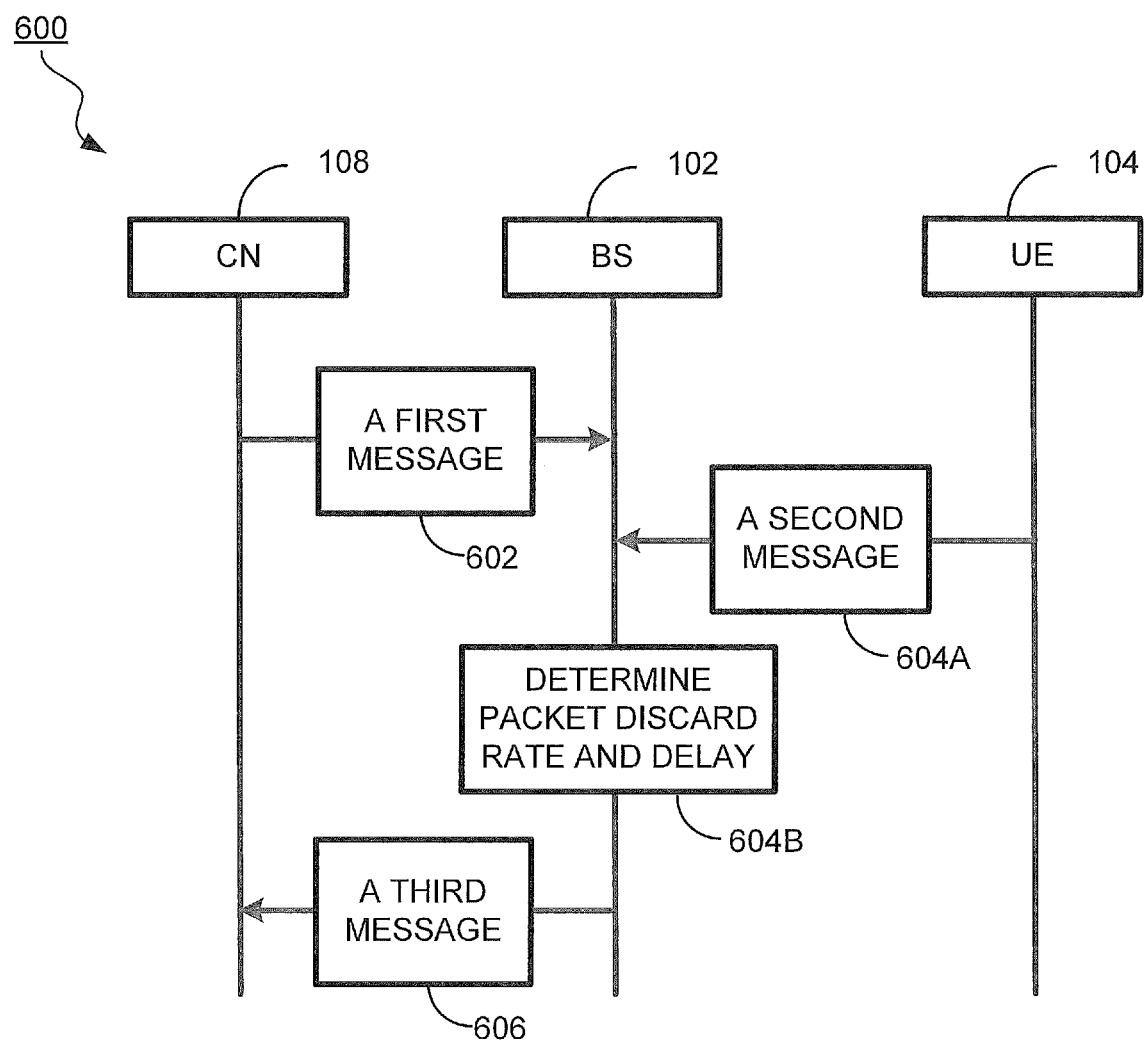
FIG. 6 illustrates a method for minimization of drive tests (MDT) in a wireless communication system, in accordance with some embodiments of the present disclosure.
Figure 8:
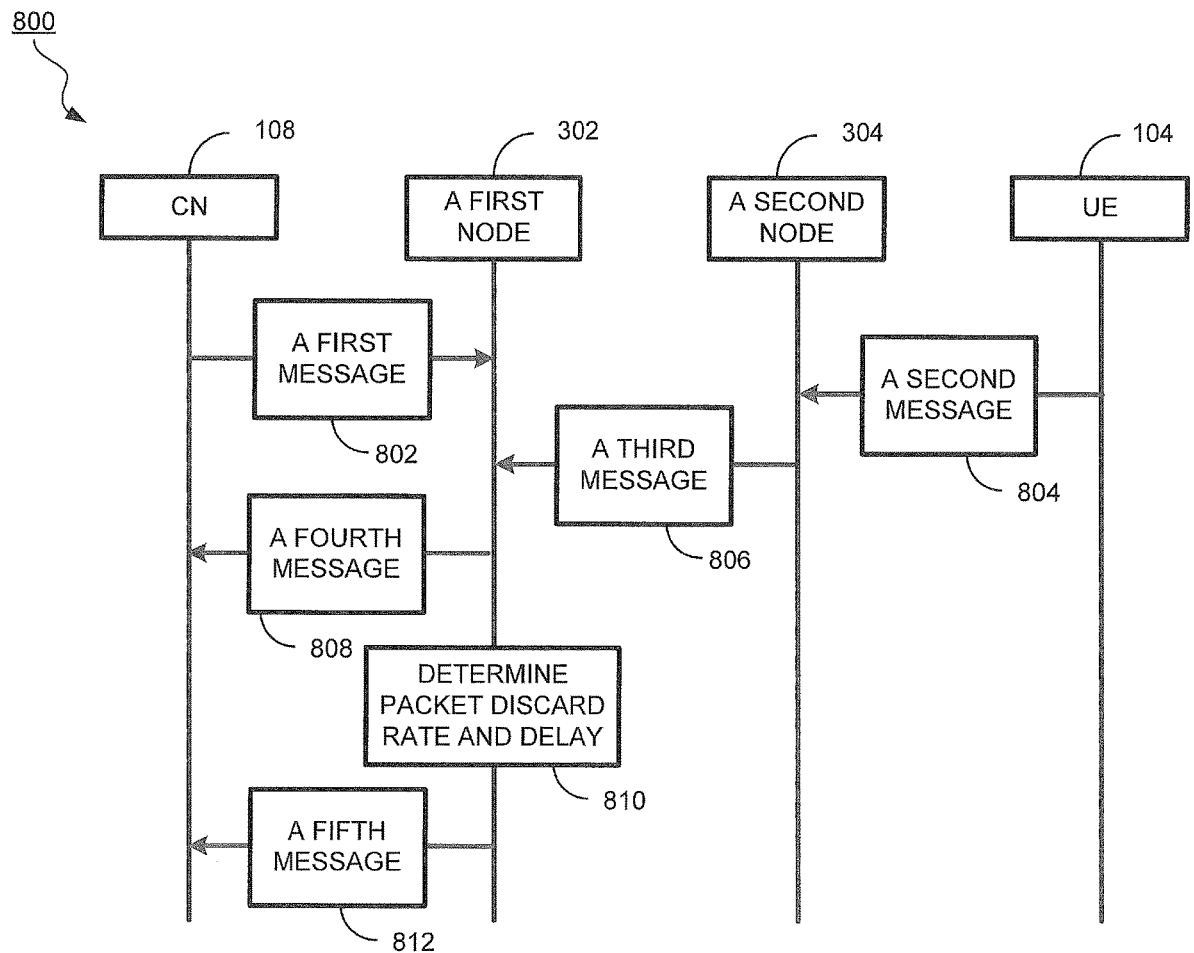
FIG. 8 illustrates a method for minimization of drive tests (MDT) in a wireless communication system, in accordance with some embodiments of the present disclosure.

FIG. 6 illustrates a method 600 for performing Minimization of Drive Tests in delay-critical services, in accordance with some embodiments of the present disclosure. It is understood that additional operations may be provided before, during, and after the method 600 of FIG. 6, and that some operations may be omitted or reordered. The communication system in the illustrated embodiment comprises a BS 102, a UE 104, and a CN 108. In the illustrated embodiments, the UE 104 is in one of at least one serving cell covered by the BS 102, i.e., the UE 104 is in connection with the BS 102. In the illustrated embodiments, the BS 102 has combined CU and DU. In some embodiments, the BS 102 is one of the following: a Master Node (MN) and a Secondary Node (SN). Furthermore, all serving cells within the BS 102 are grouped together to form a Master Cell Group (MCG) when the BS 102 is a MN, and all serving cells within the second BS 102-2 are grouped together to form a Secondary Cell Group (SCG) when the BS 102 is a SN. Packets for MDT can be carried by the BS 102 are one of the following: MCG bearers and SCG bearers. FIG. 8 is for illustration purposes and is not intend to be limiting. It should be noted that that any numbers of BS 102 can be used, which is within the scope of this invention.

The method 600 starts with operation 602 in which a first message is received by the BS 102 from the CN 108 according to some embodiments. In some embodiments, the first message is transmitted through a S1 or NG interface on the CP. In some embodiments, the first message is one of the following: an initial UE message and an Operation and Maintenance (OAM) command. In some embodiments the first message comprises a configuration of MDT for measuring packet discard rate and packet discard delay in a delay-critical QoS. In some embodiments, the first message is transmitted from the CN 108 to the BS 102 through an AMF of the CN 108. In some embodiments, the first message is received by the BS 102 from a network element (e.g., an OAM device). In some embodiments, the first message is used to indicate that a measurement of at least one of the following is required: a packet discard rate and a packet discard delay. In some embodiments, the configuration of MDT comprises at least one of the following: a measurement period, and a default PDB. In some embodiments, the measurement period is 10 seconds and the default PDB is one of the following: 23 milliseconds and 34 milliseconds. In some embodiments, the configuration of MDT is carried as an Information Element (IE) of the first message.

The method 600 continues with operation 604 in which a packet discard rate and a packet discard delay are determined by the BS 102 according to some embodiments. In some embodiments, the packet discard rate and the packet discard delay are determined (604A), during the transmission (604B) of a second message from the UE 104 to the BS 102. In some embodiments, the second message is transmitted through a Uu interface on the UP. In some embodiments, the second message comprises at least one Protocol Data Unit (PDU) in a MAC layer. In some embodiments, the at least one PDU comprises uplink (UL) data packets. In some embodiments, the BS 102 determines the packet discard rate and packet discard delay based on a Hybrid Automatic Repeat Request (HARQ) procedure.

In some embodiments, the packet discard rate is a ratio between a number of data packets that are discarded in the second message and a total number of data packets in the second message. In some embodiments, the data packets each is one of the following: an IP packet, a Service Data Adaptation Protocol (SDAP) packet, and a Packet Data Convergence Protocol (PDCP) packet. In some embodiments, the packets that are discarded, herein after discarded packets, is the packets in the second message that are successfully received by the BS 102 but failed to be submitted to a corresponding higher layer within a critical PDB. For example, a discarded IP packet is an IP packet that are successfully received but failed to be submitted to a RLC layer within the critical PDB. Similarly, a discarded SDAP packet is a SDAP packet that is successfully received but failed to be submitted to the IP layer within the critical PDB; and a discarded PDCP packet is a PDCP packet that is successfully received but failed to be submitted to a SDAP layer within the critical PDB. In some embodiments, the total number of data packets is equal to the number of discarded packets and a number of packets that are successfully received and submitted to a corresponding higher layer. In some embodiments, the packet discard delay is an average delay of a packet before being determined as a discarded packet in the measurement period. For example, the packet discard delay is determined as a time difference between a first time when the packets are received by the BS 102 from the UE 104 and a second time when the packets are determined as a discarded packet.

In some embodiments, the critical PDB is determined by the BS 102 as a time difference between a PDB of the delay-critical QoS (e.g., a QoS with a 5QI) and a transmission delay from the UPF of the CN 108 to the BS 102. In some embodiments, the at least one delay-critical QoS each is a 5G QoS with a 5QI value of 82, 83, 84, and 85. For example, when the PDB corresponding to the 5QI is 30 milliseconds and the transmission delay from the UPF of the CN 108 to the BS 102 is 5 milliseconds, the critical PDB is 25 milliseconds. In some other embodiments, the critical PDB is the default PDB configured by the CN 108 for the BS 102 in the first message.

In some embodiments, a discarded packet (e.g., a discarded IP packet, a discarded SDAP packet, and a discarded PDCP packet) is one of the following: a first packet which is actually discarded from being transmitted, and a second packet which is labeled as discarded but continuously being transmitted.

In some embodiments, the packets (i.e., IP packets, SDAP packets, and PDCP packets) when being transmitted in the MAC layer, are segmented into a plurality of RLC segments. In some embodiments, when all of the plurality of RLC segments of a packets are not transmitted to the UE 104 from the BS 102 within the critical PDB, the packet is determined as an unsuccessfully transmitted packet and thus a discarded packet. For example, when a packet is in a queue for transmission and the plurality of RLC segments of the packet are not being transmitted from the BS 102 to the UE 104 on the air interface within the critical PDB, the packet is determined as a discarded packet. For another example, when only a part of the plurality of RLC segments of the packet is transmitted from the BS 102 to the UE 104 within the critical PDB, the packet is determined as a discarded packet. For another example, when a part of the plurality of RLC segments of the packet is transmitted from the BS 102 to the UE 104 with in the critical PDB, and when a processing delay by the UE 104 and a transmission delay of the rest of the plurality of RLC segments are both considered, a transmission of the rest of the plurality of RLC segments is determined to be over the critical PDB, the packet is determined as a discarded packet. For another example, when a re-transmission of at least one of the plurality of RLC segments is over the critical PDB, the packet is determined as a discarded packet. In some embodiments, when a time difference between a first time when the second message is received from the UE 104 and a second time when packets are submitted to a corresponding higher layer is greater than the critical PDB, the packet is determined as a discarded packet.

The method 600 continues with operation in which a third message is transmitted from the BS 102 according to some embodiments. In some embodiments, the third message comprises the packet discard rate and the packet discard delay determined during the operation 204. In some embodiments, the third message is transmitted when the measurement period configured in the first message is terminated. In some embodiments, the third message is transmitted from the BS 102 to one of the following: the CN 108 and the network management system (not shown), e.g., a trace-collection entity (TCE).

Figure 7:
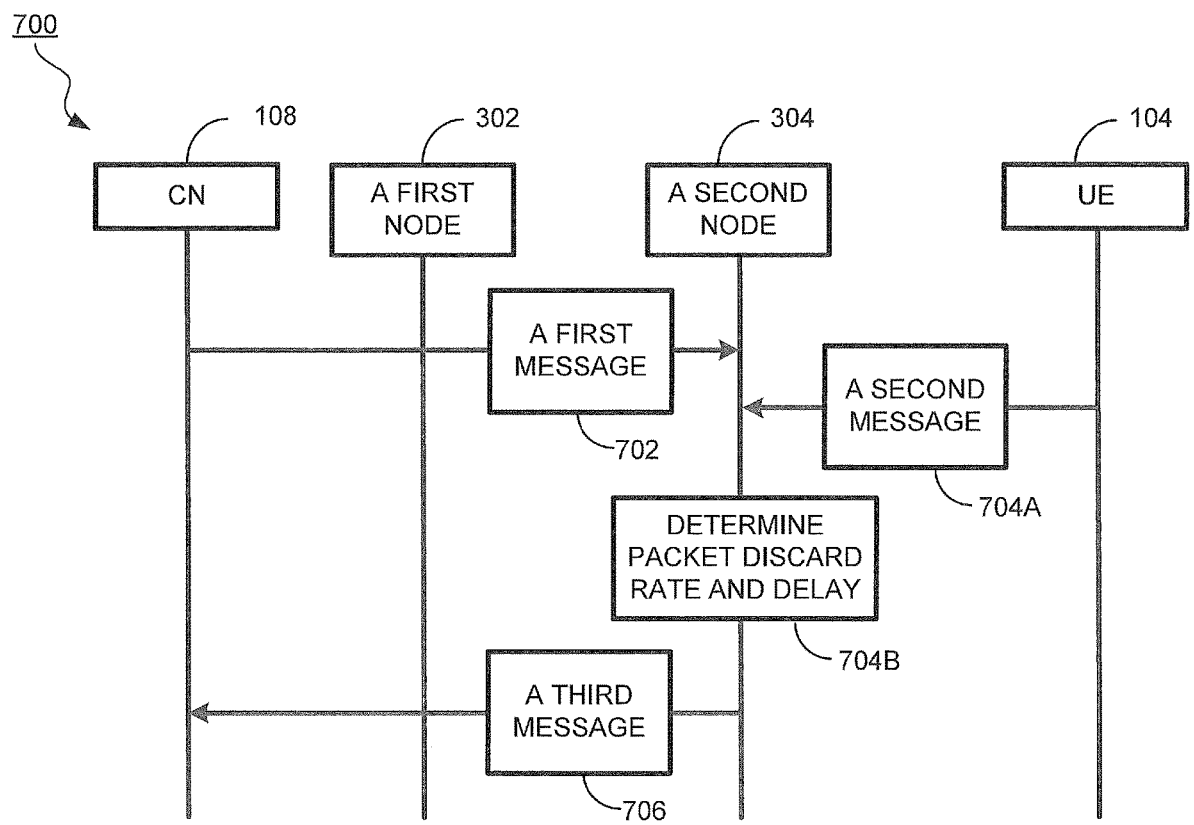
FIG. 7 illustrates a method for minimization of drive tests (MDT) in a wireless communication system, in accordance with some embodiments of the present disclosure.

FIG. 7 illustrates a method 700 for performing Minimization of Drive Tests in delay-critical services, in accordance with some embodiments of the present disclosure. It is understood that additional operations may be provided before, during, and after the method 700 of FIG. 7, and that some operations may be omitted or reordered. The communication system in the illustrated embodiment comprises a CN 108, a first node 302, a second node 304, and a UE 104. In some embodiments, the first node is a first unit of a BS 102, i.e., a CU, and a second node is a second unit of the BS 102, i.e., DU. In this case, the UE 104 is in one of at least one serving cell covered by the BS 102, i.e., the UE 104 is in connection with the BS 102. In some other embodiments, the first node 302 is a first BS and a second node 304 is a second BS. In this case, the UE 104 is in one of at least one serving cell covered by the first BS and in one of the at least one serving cell covered by the second BS, i.e., the UE 104 is in connection with the first BS and in connection with the second BS. In the illustrated embodiments, the first node 302 is a Master Node (MN); and the second node 304 is a Secondary Node (SN). Furthermore, all serving cells within the first node 302 are grouped together to form a Master Cell Group (MCG), and all serving cells within the second node 304 are grouped together to form a Secondary Cell Group (SCG). Data packets are carried by a split bearer. In the illustrated embodiment, the first node 302 comprises a SDAP layer and a PDCP layer and the second node 304 comprises a RLC layer and a MAC layer. FIG. 7 is for illustration purposes and is not intend to be limiting. It should be noted that that any numbers of BS 102 can be used, which is within the scope of this invention.

The method 700 starts with operation 702 in which a first message is received by the second node 304 according to some embodiments. In some embodiments, the first message is received by the second node 304 from one of the following: the CU 102A and a network management system (e.g., an OAM device). In some embodiments, the first message is one of the following: a UE context setup message and a UE context modification message. In some embodiments, the first message is transmitted through the F1 interface on the CP. In some embodiments, the first message is used to indicate that a measurement of at least one of the following is required: a packet discard rate and a packet discard delay. In some embodiments, the configuration of MDT comprises at least one of the following: a measurement period, and a default PDB. In some embodiments, the measurement period is 10 seconds and the default PDB is one of the following: 23 milliseconds and 34 milliseconds. In some embodiments, the configuration of MDT is carried as an IE of the first message.

The method 700 continues with operation 704 in which a packet discard rate and a packet discard delay are determined by the DU 102B of the BS 102 according to some embodiments. In some embodiments, the packet discard rate and the packet discard delay are determined during operation 704B, while a second message is received from the UE 104 by the second node 304 during operation 704A. In some embodiments, the second message is transmitted through a Uu interface on the UP from the UE 104 to the second node 304. In some embodiments, the second message comprises at least one Protocol Data Unit (PDU) in a MAC layer. In some embodiments, the at least one PDU in the second message comprises UL data packets. In some embodiments, the BS 102 determines the packet discard rate and packet discard delay based on a Hybrid Automatic Repeat Request (HARQ) procedure.

In some embodiments, the packet discard rate is a ratio between a number of data packets that are discarded in the second message and a total number of data packets in the second message. In some embodiments, the packet discard delay is an average delay of a data packet after received from the first node 302 to the second node 304 through the F1-U interface and eventually to the higher layer before being determined as a discarded packet within the measurement period. In some embodiments, the data packets are PDCP packets submitted to a SDAP layer. In some embodiments, the data packets that are discarded, herein after discarded packets, is the data packets in the second message that are not successfully transmitted within a critical PDB after being submitted to a corresponding higher layer. Specifically, discarded PDCP packets are the PDCP packets that are successfully received by the second node 304 within the critical PDB but failed to be submitted to the SDAP layer. In some embodiments, the total number of data packets is equal to the number of discarded packets and a number of packets that are successfully received and submitted to a corresponding higher layer. In some embodiments, the data packets (i.e., PDCP packets) are packets of at least one delay-critical QoS. In some embodiments, the at least one delay-critical QoS each is a 5G QoS with a 5QI value of 82, 83, 84, and 85.

In some embodiments, the critical PDB is determined as a first time difference between a PDB corresponding to a 5QI and a total transmission delay. In some embodiments, the total transmission delay comprises at least one of the following: a first delay from the first node 302 with the PDCP layer to the second node 304 with the RLC layer and a second delay from the UPF of the CN 108 to the BS 102. In some embodiments, the first delay from the CU 102A to the DU 102B can be one of the following: determined by a second time difference and configured by the network management system. In some embodiments, the second time difference is between a first time when the PDCP packets is submitted to the DU 102B from the CU 102A and a second time when the PDCP packets is received by the DU 102B on a GPRS Tunneling Protocol (GTP) tunnel on the UP (GTP-U tunnel) and submitted to a queue. In some embodiments, the first delay is configured with an average delay, e.g., 2 milliseconds. For example, when the PDB corresponding to the 5QI is 30 milliseconds, the first delay between the first network element and the second network element is 2 milliseconds and the second delay from the UPF of the CN 108 to the BS 102 is 5 milliseconds, the critical PDB is 23 milliseconds.

In some embodiments, the data packets (i.e., PDCP packets) when being transmitted in the MAC layer, are segmented into a plurality of RLC segments. In some embodiments, when all of the plurality of RLC segments of a packets are not transmitted to the UE 104 from the BS 102 within the critical PDB, the packet is determined as an unsuccessfully transmitted packet and thus a discarded packet. For example, when a packet is in a queue for transmission and the plurality of RLC segments of the packet are not being transmitted from the BS 102 to the UE 104 on the air interface within the critical PDB, the packet is determined as a discarded packet. For another example, when only a part of the plurality of RLC segments of the packet is transmitted from the BS 102 to the UE 104 within the critical PDB, the packet is determined as a discarded packet. For another example, when a part of the plurality of RLC segments of the packet is transmitted from the BS 102 to the UE 104 with in the critical PDB, and when a processing delay by the UE 104 and a transmission delay of the rest of the plurality of RLC segments are both considered, a transmission of the rest of the plurality of RLC segments is determined to be over the critical PDB, the packet is determined as a discarded packet. For another example, when a re-transmission of at least one of the plurality of RLC segments is over the critical PDB, the packet is determined as a discarded packet.

The method 700 continues with operation 706 in which a third message is transmitted from the second node 304 according to some embodiments. In some embodiments, the third message is transmitted to one of the following: the CN 108 and the network management system (not shown), e.g., a trace-collection entity (TCE). In some embodiments, the third message comprises the packet discard rate and the packet discard delay determined during the operation 704B. In some embodiments, the third message is transmitted when the measurement period is terminated.

FIG. 8 illustrates a method 800 for performing Minimization of Drive Tests in delay-critical services, in accordance with some embodiments of the present disclosure. It is understood that additional operations may be provided before, during, and after the method 800 of FIG. 8, and that some operations may be omitted or reordered. The communication system in the illustrated embodiment comprises a CN 108, a first node 302, a second node 304, and a UE 104. In some embodiments, the first node is a first unit of a BS 102, i.e., a CU and a second node is a second unit of the BS 102, i.e., DU. In this case, the UE 104 is in one of at least one serving cell covered by the BS 102, i.e., the UE 104 is in connection with the BS 102. In some other embodiments, the first node 302 is a first BS and a second node 304 is a second BS. In this case, the UE 104 is in one of at least one serving cell covered by the first BS and in one of the at least one serving cell covered by the second BS, i.e., the UE 104 is in connection with the first BS and in connection with the second BS. In the illustrated embodiments, the first node 302 is a Master Node (MN); and the second node 304 is a Secondary Node (SN). Furthermore, all serving cells within the first node 302 are grouped together to form a Master Cell Group (MCG), and all serving cells within the second node 304 are grouped together to form a Secondary Cell Group (SCG). Data packets are carried by a split bearer. In the illustrated embodiment, the first node 302 comprises a SDAP layer and a PDCP layer and the second node 304 comprises a RLC layer and a MAC layer. FIG. 8 is for illustration purposes and is not intend to be limiting. It should be noted that that any numbers of BS 102 can be used, which is within the scope of this invention.

The method 800 starts with operation 802 in which a first message is received by the first node 302 according to some embodiments. In some embodiments, the first message is received by the first node 302 from one of the following: the network management system (not shown) and an AMF of the CN 108. In some embodiments, the first message is transmitted on a S1 or NG interface on the CP. In some embodiments, the first message is one of the following: an initial UE message and an Operation and Maintenance (OAM) commend. In some embodiments the first message comprises a configuration of MDT for measuring packet discard rate and packet discard delay in a delay-critical QoS. In some embodiments, the first message is transmitted from the CN 108 to the first node 302 through the AMF of the CN 108. In some embodiments, the first message is received by the first node 302 from a network element (e.g., an OAM device). In some embodiments, the first message is used to indicate that a measurement of at least one of the following is required: a packet discard rate and a packet discard delay. In some embodiments, the configuration of MDT comprises a measurement period. In some embodiments, the measurement period is 10 seconds and the default PDB is one of the following: 23 milliseconds and 34 milliseconds. In some embodiments, the configuration of MDT is carried as an Information Element (IE) of the first message.

The method 800 continues with operation 804 in which a second message is received by the second node 304 from the UE 104 according to some embodiments. In some embodiments, the third message is transmitted through a Uu interface on the UP from the UE 104 to the second node 304. In some embodiments, the third message comprises at least one Protocol Data Unit (PDU) in a MAC layer. In some embodiments, the at least one PDU in the second message comprises UL data packets. In some embodiments, the UL data packets each is a PDCP packet. In some embodiments, the second message also comprises a first time for a corresponding UL data packet.

The method 800 continues with operation 806 in which a third message is received by the first node 302 from the second node 304 according to some embodiments. In some embodiments, the third message is received by the first node 302 from the second node 304 on the UP. In some embodiments, the third message comprises the at least one PDU carrying the UL data packets in the second message and the first time of the corresponding data packets.

The method 800 continues with operation 808 in which a fourth message is transmitted from the first node 302 according to some embodiments. In some embodiments, the fourth message is transmitted by the first node 302 to the UPF of the CN 108. In some embodiments, the UL data packets in the second message is transmitted by the first node 302 to the UPF of the CN 108 at a second time.

The method 800 continues with operation 810 in which a packet discard rate and a packet discard delay are determined by the first node 302 according to some embodiments. In some embodiments, the packet discard rate and the packet discard delay are determined according to the fourth message received from the second node 304.

In some embodiments, the packet discard rate is a ratio between a number of data packets that are discarded in the second message and a total number of data packets in the second message. In some embodiments, the packet discard delay is an average delay of a data packet after being submitted to a corresponding layer in the measurement period before being determined as a discarded packet. In some embodiments, the data packets each is one of the following: a SDAP packet and an IP packet. In some other embodiments, the packets that are discarded, herein after discarded packets, is the packets in the third message that are successfully received but failed to be submitted to corresponding higher layer within the critical PDB. For example, a discarded IP packet is an IP packet that is successfully received but failed to be submitted to the RLC layer within the critical PDB. Similarly, a discarded SDAP packet is a SDAP packet that is successfully received but failed to be submitted to the IP layer.

In some embodiments, the critical PDB is determined by the BS 102 as a time difference between a PDB of the delay-critical QoS (e.g., a QoS with a 5QI) and a transmission delay from the UPF of the CN 108 to the BS 102. In some embodiments, the at least one delay-critical QoS each is a 5G QoS with a 5QI value of 82, 83, 84, and 85. For example, when the PDB corresponding to the 5QI is 30 milliseconds and the transmission delay from the UPF of the CN 108 to the BS 102 is 5 milliseconds, the critical PDB is 25 milliseconds.

In some embodiments, the data packets (i.e., IP packets, or SDAP packets) when being transmitted in the MAC layer, are segmented into a plurality of RLC segments. In some embodiments, when all of the plurality of RLC segments of a data packets are not transmitted to the second node 304 from the UE 104 within the critical PDB, the data packet is determined as an unsuccessfully transmitted packet and thus a discarded packet. For example, when a packet is in a queue for transmission and the plurality of RLC segments of the packet are not being transmitted from the UE 104 to the second node 304 on the air interface within the critical PDB, the packet is determined as a discarded packet. For another example, when only a part of the plurality of RLC segments of the packet is transmitted from the UE 104 to the second node 304 within the critical PDB, the packet is determined as a discarded packet. For another example, when a part of the plurality of RLC segments of the packet is transmitted from the UE 104 to the second node 304 with in the critical PDB, and when a processing delay by the UE 104 and a transmission delay of the rest of the plurality of RLC segments are both considered, a transmission of the rest of the plurality of RLC segments is determined to be over the critical PDB, the packet is determined as a discarded packet. For another example, when a re-transmission of at least one of the plurality of RLC segments is over the critical PDB, the packet is determined as a discarded packet.

The method 800 continues with operation 812 in which a fifth message is transmitted from the first node 302 according to some embodiments. In some embodiments, the fifth message comprises the packet discard rate and the packet discard delay determined during the operation 812. In some embodiments, the fifth message is transmitted when the measurement period is terminated. In some embodiments, the fifth message is transmitted from the first node 302 to one of the following: the network management system (not shown), e.g., a trace-collection entity (TCE), and the CN 108.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method for performing a Minimization of Driver Test (MDT) by a first wireless communication node, comprising:
  receiving a first message from a second wireless communication node; and
  determining at least one of the following: a data packet discard rate and a packet discard delay according to the first message,
  wherein the first message comprises a MDT configuration, wherein the MDT configuration indicates a determination of at least one of the following: the data packet discard rate and the packet discard delay, and wherein the MDT configuration comprises at least one of the following: a measurement period and a first Packet Delay Budget (PDB),
  wherein the packet discard rate is a ratio between a number of discarded packets and a total number of packets, wherein each of the packets is one of the following on a corresponding layer in at least one delay-critical Quality of Service (QoS): a downlink (DL) packet and an uplink (UL) packet, wherein the at least one delay-critical QoS is determined according to one of the following: QoS information carried by a Data Radio Bearer (DRB) and packet information of a QoS, wherein the discarded packets comprises at least one Radio Link Control (RLC) segment, wherein the at least one RLC segment is not transmitted to the wireless communication device within a second PDB, and wherein the discarded packets each is one of the following: a first packet and a second packet, wherein the first packet is one of the packets discarded, and wherein the second packet is one of the packets labeled as discarded and being transmitted.

2. The method of claim 1, wherein the first message is received by the first wireless communication node on a Control Plane (CP) through one of the following: a S1 interface and an NG interface.

3. The method of claim 1, wherein the determining is performed by one of the following: a first unit of the first wireless communication node and a second unit of the first wireless communication node, wherein the first unit is a centralized unit (CU) and the second unit is a distributed unit (DU).

4. The method of claim 1, wherein the first wireless communication node comprises one of the following: a Packet Data Convergence Protocol (PDCP) layer and a Radio Link Control (RLC) layer.

5. The method of claim 1, wherein the second wireless communication node is one of the following: a core network, and an Operation and Maintenance (OAM) system.

6. The method of claim 1, wherein the determining further comprising one of the following:

transmitting a second message to a wireless communication device, and receiving a third message from the wireless communication device, wherein each of the second message and the third message is transmitted through a Uu interface on a User Plane (UP), and wherein each of the second message and the third message comprises at least one Protocol Data Unit (PDU) in a Media Access Control (MAC) layer.

7. The method of claim 1, wherein the DL packet is one of the following: an Internet Protocol (IP) packet submitted to a Service Data Adaptation Protocol (SDAP) layer, a SDAP packet submitted to a Packet Data Convergence Protocol (PDCP) layer, and a PDCP packet submitted to a RLC layer.

8. The method of claim 1, wherein the UL packet is one of the following: a discarded packet and a packet received on a layer and submitted to a higher layer, and wherein the UL packet is one of the following: an Internet Protocol (IP) packet, a Packet Data Convergence Protocol (PDCP) packet, and a Service Data Adaptation Protocol (SDAP packet.

9. The method of claim 1, wherein the second PDB is determined according to one of the following: a time difference between a third PDB of one of the at least one delay-critical QoS and a total transmission delay and the first PDB in the first message, and wherein the total transmission delay comprises at least one of the following: a first delay between the first wireless communication node and the second wireless communication node and a second delay between the first wireless communication node and a third wireless communication node.

* * * * *